(12) United States Patent
Deachin et al.

(10) Patent No.: US 7,494,179 B2
(45) Date of Patent: Feb. 24, 2009

(54) MEMBER FOR BAFFLING, REINFORCEMENT OR SEALING

(75) Inventors: Todd Deachin, Goodrich, MI (US); Amy Ingram, Sterling Heights, MI (US); Matthew Thomas, Imlay City, MI (US)

(73) Assignee: Zephyros, Inc., Romeo, MI (US)

(*) Notice: Subject to any disclaimer, the term of this patent is extended or adjusted under 35 U.S.C. 154(b) by 123 days.

(21) Appl. No.: 11/390,658

(22) Filed: Mar. 28, 2006

(65) Prior Publication Data

US 2007/0074808 A1 Apr. 5, 2007

Related U.S. Application Data

(60) Provisional application No. 60/735,546, filed on Nov. 10, 2005, provisional application No. 60/674,919, filed on Apr. 26, 2005.

(51) Int. Cl.
*B29C 65/02* (2006.01)

(52) U.S. Cl. ..................... 296/187.02; 156/78

(58) Field of Classification Search ............... 296/39.3, 296/187.02; 428/36.5, 316.6; 156/78; 264/46.5; 277/316

See application file for complete search history.

(56) References Cited

U.S. PATENT DOCUMENTS

| | | | |
|---|---|---|---|
| 3,162,086 A | 12/1964 | Wells | |
| 3,400,182 A | 9/1968 | Kolt | |
| 3,851,794 A | 12/1974 | Hehl | |
| 4,290,536 A | 9/1981 | Morel | |
| 4,440,434 A | 4/1984 | Celli et al. | |
| 4,463,870 A | 8/1984 | Coburn, Jr. et al. | |
| 4,598,008 A | 7/1986 | Vogt et al. | |
| 4,751,249 A | 6/1988 | Wycech | |
| 4,810,548 A | 3/1989 | Ligon, Sr. et al. | |
| 4,813,690 A | 3/1989 | Coburn, Jr. | |
| 4,901,500 A | 2/1990 | Wycech | |
| 5,102,188 A | 4/1992 | Yamane | |
| 5,474,721 A * | 12/1995 | Stevens | 264/45.3 |
| 5,506,025 A | 4/1996 | Otto et al. | |
| 5,575,526 A | 11/1996 | Wycech | |
| 5,631,027 A | 5/1997 | Takabatake | |
| 5,642,914 A | 7/1997 | Takabatake | |
| 5,725,272 A | 3/1998 | Jones | |
| 5,755,486 A | 5/1998 | Wycech | |
| 5,766,719 A | 6/1998 | Rimkus | |

(Continued)

FOREIGN PATENT DOCUMENTS

DE 38 38 655 A1 5/1990

(Continued)

OTHER PUBLICATIONS

Lilley et al., Comparison of Preformed Acoustic Baffles and Two-Component Polyurethane Foams for Filling Body Cavities.

(Continued)

*Primary Examiner*—Dennis H. Pedder
*Assistant Examiner*—Paul Chenevert
(74) *Attorney, Agent, or Firm*—Dobrusin & Thennisch PC

(57) ABSTRACT

There is described a member for baffling, reinforcement or sealing. Typically, the member includes an internal portion and external portion wherein at least one, but typically both the internal and external portions include an activatable (e.g., expandable) material.

19 Claims, 8 Drawing Sheets

U.S. PATENT DOCUMENTS

| | | | |
|---|---|---|---|
| 5,806,915 A | 9/1998 | Takabatake | |
| 5,884,960 A * | 3/1999 | Wycech | 296/146.6 |
| 5,904,024 A | 5/1999 | Miwa | |
| 5,931,474 A | 8/1999 | Chang et al. | |
| 5,932,680 A | 8/1999 | Heider | |
| 5,937,486 A | 8/1999 | Bockenheimer | |
| 6,003,274 A | 12/1999 | Wycech | |
| 6,006,484 A | 12/1999 | Geissbuhler | |
| 6,033,300 A | 3/2000 | Schneider | |
| 6,093,358 A | 7/2000 | Schiewe et al. | |
| 6,103,341 A | 8/2000 | Barz et al. | |
| 6,131,897 A | 10/2000 | Barz et al. | |
| 6,146,565 A | 11/2000 | Keller | |
| 6,150,428 A | 11/2000 | Hanley, IV et al. | |
| 6,244,601 B1 | 6/2001 | Buchholz et al. | |
| 6,247,287 B1 | 6/2001 | Takabatake | |
| 6,263,635 B1 * | 7/2001 | Czaplicki | 52/731.6 |
| 6,281,260 B1 | 8/2001 | Hanley, IV et al. | |
| 6,296,298 B1 | 10/2001 | Barz | |
| 6,347,799 B1 | 2/2002 | Williams et al. | |
| 6,358,584 B1 * | 3/2002 | Czaplicki | 428/36.5 |
| 6,368,438 B1 | 4/2002 | Chang et al. | |
| 6,382,635 B1 | 5/2002 | Fitzgerald | |
| 6,383,610 B1 | 5/2002 | Barz et al. | |
| 6,413,611 B1 | 7/2002 | Roberts et al. | |
| 6,422,575 B1 | 7/2002 | Czaplicki et al. | |
| 6,444,713 B1 | 9/2002 | Pachl et al. | |
| 6,474,722 B2 | 11/2002 | Barz | |
| 6,491,336 B1 | 12/2002 | Beckmann et al. | |
| 6,519,854 B2 | 2/2003 | Blank | |
| 6,520,505 B1 * | 2/2003 | Kogler et al. | 277/314 |
| 6,523,857 B1 | 2/2003 | Hopton et al. | |
| 6,530,187 B2 * | 3/2003 | Shimizu | 52/220.1 |
| 6,607,238 B2 | 8/2003 | Barz | |
| 6,619,727 B1 | 9/2003 | Barz et al. | |
| 6,668,457 B1 | 12/2003 | Czaplicki | |
| 6,691,468 B2 | 2/2004 | Helferty | |
| 6,692,347 B1 | 2/2004 | Schneider | |
| 6,708,979 B2 | 3/2004 | Stratman et al. | |
| 6,722,720 B2 | 4/2004 | Donick et al. | |
| 6,786,533 B2 | 9/2004 | Bock et al. | |
| 6,880,657 B2 | 4/2005 | Schneider et al. | |
| 6,890,021 B2 | 5/2005 | Bock et al. | |
| 6,920,693 B2 | 7/2005 | Hankins et al. | |
| 6,921,130 B2 | 7/2005 | Barz et al. | |
| 6,938,947 B2 | 9/2005 | Barz et al. | |
| 6,953,219 B2 | 10/2005 | Lutz et al. | |
| 6,955,593 B2 | 10/2005 | Lewis et al. | |
| 7,090,273 B2 * | 8/2006 | Stojkovic et al. | 296/29 |
| 7,141,194 B1 | 11/2006 | Beckmann | |
| 7,144,071 B2 | 12/2006 | Le Gall et al. | |
| 7,150,495 B2 * | 12/2006 | Fayt et al. | 296/187.02 |
| 7,199,165 B2 | 4/2007 | Kassa et al. | |
| 2001/0001355 A1 * | 5/2001 | Shimizu | 52/220.1 |
| 2002/0074827 A1 | 6/2002 | Fitzgerald et al. | |
| 2002/0164450 A1 | 11/2002 | Lupini et al. | |
| 2003/0057737 A1 | 3/2003 | Bock et al. | |
| 2003/0218019 A1 | 11/2003 | Le Gall et al. | |
| 2004/0011282 A1 | 1/2004 | Myers et al. | |
| 2004/0018353 A1 | 1/2004 | Czaplicki et al. | |
| 2004/0034982 A1 | 2/2004 | Wieber et al. | |
| 2004/0056472 A1 | 3/2004 | Schneider | |
| 2004/0084141 A1 | 5/2004 | Czaplicki | |
| 2004/0217626 A1 | 11/2004 | Barz et al. | |
| 2004/0262810 A1 | 12/2004 | Barz et al. | |
| 2004/0262853 A1 | 12/2004 | Larsen et al. | |
| 2005/0012280 A1 | 1/2005 | Richardson | |
| 2005/0017542 A1 * | 1/2005 | Belpaire | 296/187.01 |
| 2005/0081383 A1 | 4/2005 | Kosal et al. | |
| 2005/0082111 A1 | 4/2005 | Weber | |
| 2005/0087899 A1 | 4/2005 | Coon et al. | |
| 2005/0126848 A1 | 6/2005 | Siavoshai et al. | |
| 2005/0194706 A1 | 9/2005 | Kosal et al. | |
| 2005/0212326 A1 | 9/2005 | Marion | |
| 2005/0218697 A1 | 10/2005 | Barz et al. | |
| 2005/0230165 A1 | 10/2005 | Thomas et al. | |
| 2005/0249936 A1 | 11/2005 | Ui et al. | |
| 2005/0268454 A1 | 12/2005 | White | |
| 2005/0279567 A1 | 12/2005 | Ito | |
| 2005/0285292 A1 | 12/2005 | Mendiboure et al. | |
| 2006/0006695 A1 | 1/2006 | Lutz et al. | |
| 2006/0008615 A1 | 1/2006 | Muteau et al. | |
| 2006/0019595 A1 | 1/2006 | Lewis et al. | |
| 2006/0041227 A1 | 2/2006 | Takabatake | |
| 2006/0043772 A1 | 3/2006 | Richardson | |
| 2006/0057333 A1 | 3/2006 | Brahim | |
| 2006/0061137 A1 * | 3/2006 | Stojkovic et al. | 296/198 |
| 2006/0065483 A1 | 3/2006 | Thomas | |
| 2007/0045042 A1 | 3/2007 | Barz et al. | |

FOREIGN PATENT DOCUMENTS

| | | | |
|---|---|---|---|
| EP | 153564 A2 * | 9/1985 | |
| EP | 0 697 956 B1 | 2/1996 | |
| EP | 1 134 126 B1 | 3/2001 | |
| EP | 1 031 496 B1 | 12/2001 | |
| EP | 1 182 087 A2 | 2/2002 | |
| EP | 1 362 683 A2 | 11/2003 | |
| EP | 1 366 960 A1 | 12/2003 | |
| EP | 1 419 954 A2 | 5/2004 | |
| EP | 1 484 162 A1 | 12/2004 | |
| EP | 1 591 224 A1 | 2/2005 | |
| EP | 1 591 224 | 11/2005 | |
| EP | 1 458 594 B1 | 3/2006 | |
| EP | 1 666 228 A2 | 6/2006 | |
| FR | 2 780 952 | 1/2000 | |
| GB | 2 197 267 A | 5/1988 | |
| JP | 3-197743 | 8/1991 | |
| JP | 10-45031 | 2/1998 | |
| JP | 10053156 | 2/1998 | |
| JP | 10-71628 | 3/1998 | |
| JP | 2000-52444 | 2/2000 | |
| JP | 2001-62833 | 3/2001 | |
| JP | 2001-199362 | 7/2001 | |
| JP | 2002-120250 | 4/2002 | |
| JP | 2002331960 | 11/2002 | |
| JP | 2002-362412 | 12/2002 | |
| JP | 2003-226261 | 8/2003 | |
| WO | WO98/36944 | 8/1998 | |
| WO | WO00/03894 | 1/2000 | |
| WO | WO00/05320 | 2/2000 | |
| WO | WO01/19667 A1 | 3/2001 | |
| WO | WO01/24989 | 4/2001 | |
| WO | WO01/30906 | 5/2001 | |
| WO | WO01/54936 | 8/2001 | |
| WO | WO01/71225 | 9/2001 | |
| WO | WO01/83206 | 11/2001 | |
| WO | WO01/88033 | 11/2001 | |
| WO | WO03/051676 | 6/2003 | |
| WO | WO03/061934 | 7/2003 | |
| WO | WO2005/044630 A1 | 5/2005 | |
| WO | WO2005/105405 | 11/2005 | |

OTHER PUBLICATIONS

Lilley et al., Vehicle Acoustic Solutions.
Copending U.S. Appl. No. 10/718,509, filed Nov. 20, 2003.
Copending U.S. Appl. No. 10/761,635, filed Jan. 21, 2004.
Copending U.S. Appl. No. 10/839,084, filed May 5, 2004.
Copending U.S. Appl. No. 10/806,309, filed Mar. 22, 2004.
Copending Patent Application Serial No. GB 0220945.0 filed Sep. 10, 2002.
Copending Patent Application Serial No. EP 0300159.1 filed Jan. 6, 2003.
Copending U.S. Appl. No. 10/920,520, filed Aug. 18, 2004.

Copending U.S. Appl. No. 10/941,553, filed Sep. 15, 2004.
Copending U.S. Appl. No. 10/973,050, filed Oct. 25, 2004.
Copending U.S. Appl. No. 10/967,783, filed Nov. 20, 2004.
Copending U.S. Appl. No. 60/675,581, filed Apr. 28, 2005.
Copending U.S. Appl. No. 60/676,406, filed Apr. 29, 2005.
Copending U.S. Appl. No. 60/680,268, filed May 12, 2005.
Copending U.S. Appl. No. 60/688,255, filed Jun. 7, 2005.
Copending U.S. Appl. No. 11/188,679, filed Jul. 25, 2005.
Copending U.S. Appl. No. 11/189,190, filed Jul. 26, 2005.
Copending U.S. Appl. No. 60/709,947, filed Aug. 19, 2005.
Copending U.S. Appl. No. 60/711,101, filed Aug. 25, 2005.
Copending U.S. Appl. No. 60/720,867, filed Sep. 27, 2005.
Copending U.S. Appl. No. 11/254,129, filed Oct. 19, 2005.
Copending U.S. Appl. No. 60/729,820, filed Oct. 25, 2005.
Copending U.S. Appl. No. 60/729,821, filed Oct. 25, 2005.
Copending U.S. Appl. No. 60/740,766, filed Nov. 30, 2005.
Copending U.S. Appl. No. 11/339,431, filed Jan. 25, 2006.
Copending U.S. Appl. No. 60/771,713, filed Feb. 9, 2006.

* cited by examiner

MEMBER FOR BAFFLING, REINFORCEMENT OR SEALING

This application claims the benefit of the filing date of U.S. Provisional Application Nos. 60/674,919 filed Apr. 26, 2005 and Provisional Application Nos. 60/735,546 filed Nov. 10, 2005.

FIELD OF THE INVENTION

The present invention relates generally to a member for providing sealing, baffling, reinforcement or a combination thereof to an article of manufacture such as an automotive vehicle.

BACKGROUND OF THE INVENTION

For many years, industry and particularly the transportation industry has been concerned with designing members for providing baffling, sealing, structural reinforcement or the like to articles of manufacture such as automotive vehicles. For example, U.S. Pat. Nos. 5,755,486; 4,901,500; and 4,751,249 describe prior art devices. Generally, the members include expandable materials, which may or may not be combined with other materials for forming seals, baffles, structural reinforcements or the like. Design of such members can be problematic for a variety of reasons. As an example, such members may need to have features or characteristics for accommodating assembly of articles of manufactures to which they are installed. As another example, such members may need to one or more provide multiple functional attributes such as baffling, sealing, structural reinforcement, combinations thereof or the like to multiple locations of one or more structures of the articles of manufactures. As such, the present invention provides a member that provides one of the aforementioned desirable design characteristics or provides other desirable characteristics as will become apparent from the following disclosure.

SUMMARY OF THE INVENTION

The present invention is directed to a member that provides sealing, baffling or both to a structure of an article of manufacture such as an automotive vehicle. The member typically includes a first or internal portion that is configured to be disposed substantially internally within a structure of the article of manufacture and a second or external portion that is configured to be disposed substantially externally of the structure. In one preferred embodiment, the structure is tubular and the member includes a baffling portion for internally baffling and sealing the tubular structure and the member also includes a sealing portion that externally seals about the tubular structure.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

The present invention is predicated upon the provision of a member suitable for providing sealing, baffling, reinforcement or a combination thereof to one or more structures of an article of manufacture. Together, the one or more structures and the member form a system or assembly that is generally desirable for the article of manufacture because of the functional attributes (e.g., noise reduction, sealing, strength, combinations thereof or the like) provided by the member. It is contemplated that the member may be employed in conjunction with a variety of structures of various articles of manufacture such as boats, trains, buildings, appliances, homes, furniture or the like. It has been found, however, that the member is particularly suitable for application to structures or assemblies of transportation vehicles such as automotive vehicles. Generally, it is contemplated that the member may be applied to various structures such as components of a body, a frame, an engine, a hood, a trunk, a bumper, combinations thereof or the like of an automotive vehicle.

The member typically includes one or more of the following:

i) a first or internal portion, which typically includes a first or internal carrier member with expandable material disposed upon the first or internal carrier member;

ii) a second or external portion, which typically includes a second or external carrier member with expandable material disposed upon the second or external carrier member;

iii) one or more attachments for attaching or connecting the first portion to the second portion and/or for assisting in locating the member relative to one or more structures of an article of manufacture; and iv) optionally, one or more openings (e.g., cavities, through-holes or the like) for accommodating one or more components of the article of manufacture.

Figure 1:
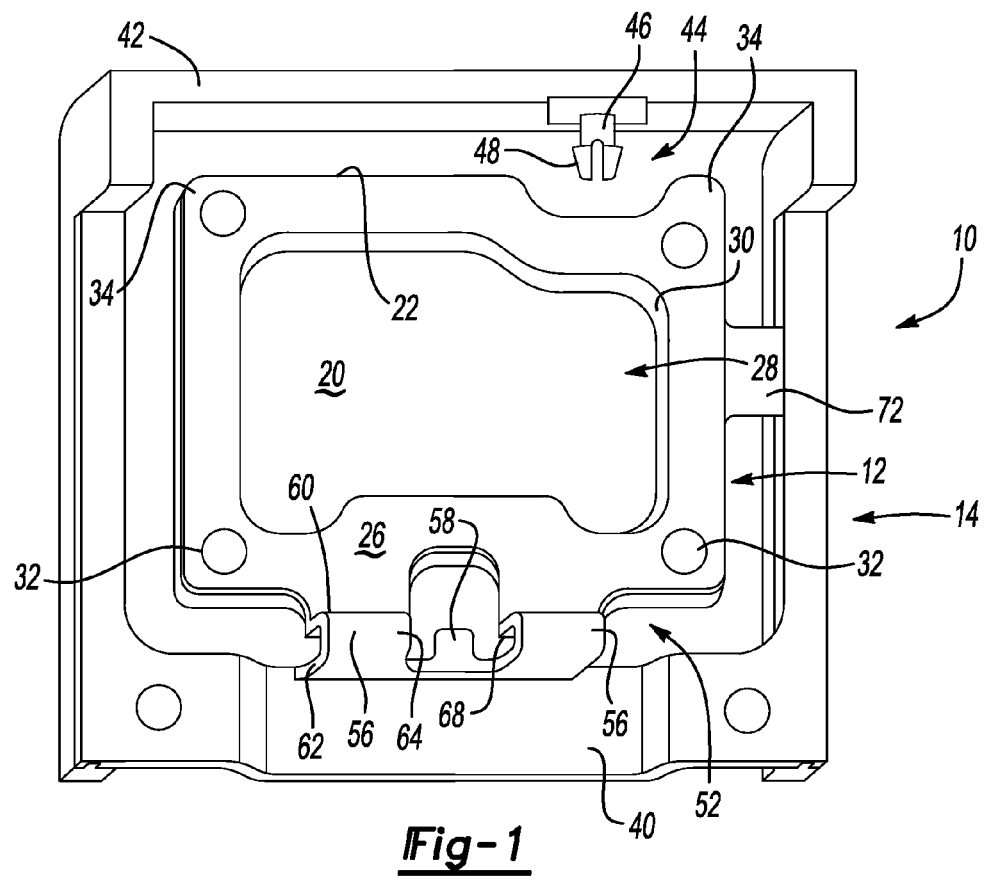
FIG. 1 is a front perspective view of an exemplary member in accordance with an aspect of the present invention.
Figure 2:
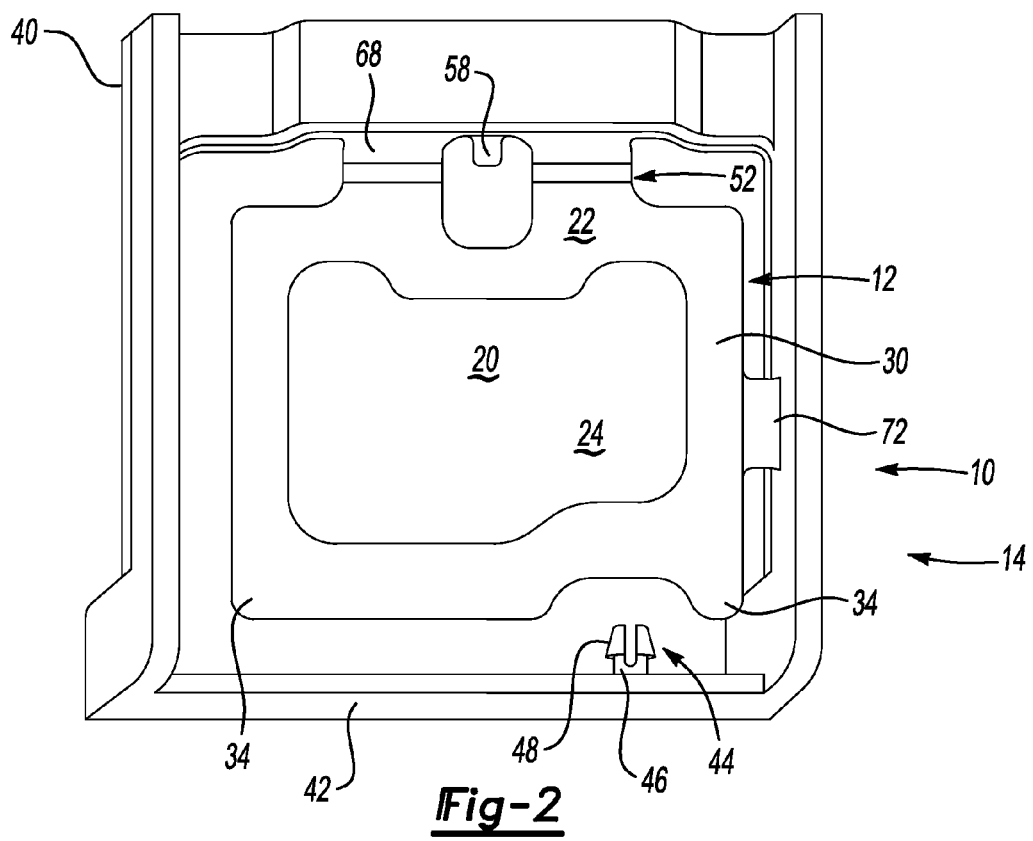
FIG. 2 is a rear perspective view of the exemplary member of FIG. 1.
Figure 3:
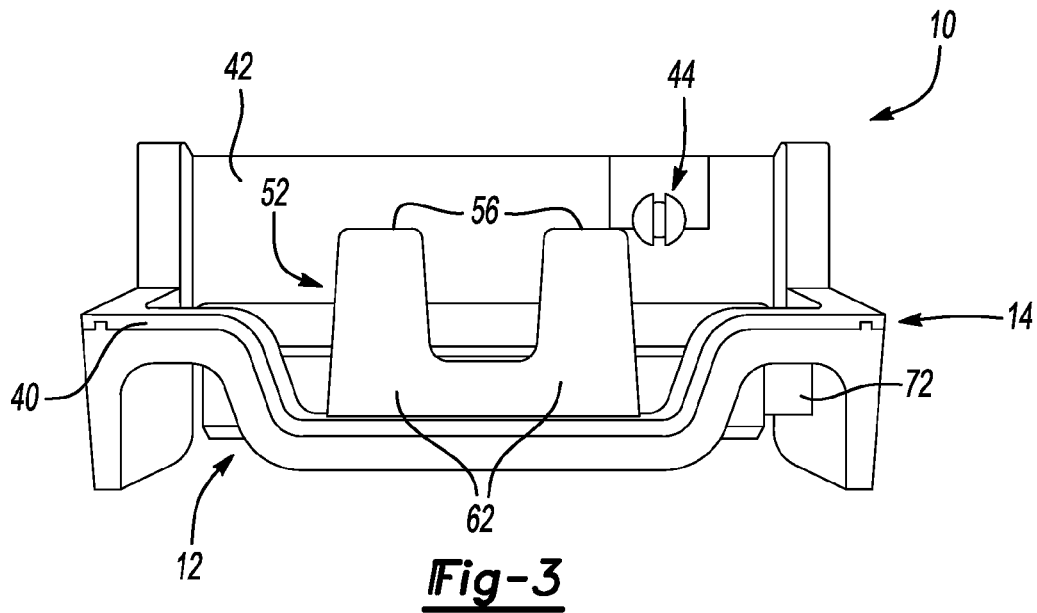
FIG. 3 is a side perspective view of the exemplary member of FIG. 1.

Referring to FIGS. 1-3, there is illustrated one exemplary member 10 according to the present invention for providing sealing, baffling, reinforcement, combinations thereof or the like to one or more structures of an article of manufacture and particularly to structures of an automotive vehicle. The member 10 includes a first or internal portion 12 and second or external portion 14.

The internal member 12 include an internal carrier member 20 with expandable material 22 disposed thereon. The carrier member 20 is shown to be generally rectangular and planar with a first generally planar surface 24 opposite a second surface 26, which defines a cavity 28 that spans substantially the entirety of the second surface 26. The carrier member 20 has an outer periphery 30 and the expandable material 22 is a generally continuous mass that extends about or adjacent the outer periphery 30 and is adhered thereto.

In the embodiment shown, the mass 22 of expandable material is substantially annular and extend substantially continuously about the carrier member 20 adjacent the periphery 30. As used herein, annular, unless otherwise specified, is intended to mean extending continuously, substantially continuously (at least 50%, 80%, 95% or greater continuous) or intermittently about open space or about another object. As such, annular has no particular shape, unless otherwise specified, and can include rectangular, circular or other geometric or non-geometric shapes.

In FIGS. 1-3, the carrier member 20 includes an opening 32 (e.g., a through-hole) at or adjacent each of four corners 34 or the carrier member 20 and the expandable material 22 extends at least partially into the openings 32 for assisting in attaching the expandable material to the carrier member 20.

The second or external portion 14 includes a carrier member 40 and an expandable material 42 that is attached to and at least partially coextensive with the carrier member 40. In the illustrated embodiment, the carrier member 40 is annular and more specifically, U-shaped and the expandable material 42 is adhered to the carrier member 40.

The mass 42 of expandable material is annular and is entirely continuous, although the mass 42 could be non-continuous or intermittent. The mass 42 also includes multiple contours, which are typically designed to allow the mass 42 to substantially conform to one or more structures to which it is to be applied. The mass 42 also includes an fastener 44 that has a thinner portion 46 extending to a thicker portion 48.

The member 10 of FIGS. 1-3, also typically includes at least one attachment for connecting the internal portion 12 to the external portion 14, although the portions could be provide separately. In the embodiment shown, the member 10 includes a first attachment 52 that is comprised of a pair of flanges 56 and a projection 58. Each of the flanges 56 includes a first portion 60 connected to a second portion 62 by a third portion 64 wherein the first portion 60 is connected to the carrier member 20 of the internal portion 12 and the second portion 62 is connected to the carrier member 40 of the external portion 14. In the embodiment shown, the first portion 60 is opposing and coextensive with the second portion 62 with the third portion 64 interconnecting the first and second portions 60, 62. In this manner, each of the flanges 56 defines a cavity 68.

The projection 58 is shown as being connected to the carrier member 40 of the external portion 14 and as extending generally away from one of the first and second portions 60, 62 and toward the other of the first and second portions 60, 62. It should be understood, however that the projection 58 could be attached to the carrier member 20 of the internal portion 12, the flanges 56 or either of the expandable materials 22, 42.

In the embodiment illustrated, the flanges 56, the projection 58, the carrier members 20, 40 are all integrally molded or formed of single material that is different from the expandable materials 22, 42. Suitable materials can include for example, and without limitation, metal or a polymeric material (e.g., nylon, polyamide, polyester, polypropylene, polyethylene or others) which may be filled or unfilled (e.g., filled with glass reinforcement fibers). In addition, however, it is contemplated that at least the projection 58 and the flanges 56 may be formed of different materials and it is also contemplated that these components may be formed of expandable material. Further, it is contemplated that the carrier members 20, 40 may be formed of different materials relative to each other. It is also contemplated that, the flanges 56, the projection 58 and the carrier members 20, 40 may all be formed of expandable material. As such, it is contemplated that the attachment 52 may directly connect the carrier members 20, 40 to each other or indirectly connect them and such connection should not be limited unless specified.

In the embodiment shown, the member 10 also include a second attachment member 72. The second attachment member 72 is formed of expandable material and connects the expandable material 22 of the internal portion 12 to the expandable material 42 of the external portion 14. In such an embodiment, the second attachment member 72 is typically integrally molded with the expandable materials 22, 42 although not required. The attachment member 72 is also typically formed of the same material as one or both of the expandable materials 22, 42, although not required.

Figure 4:
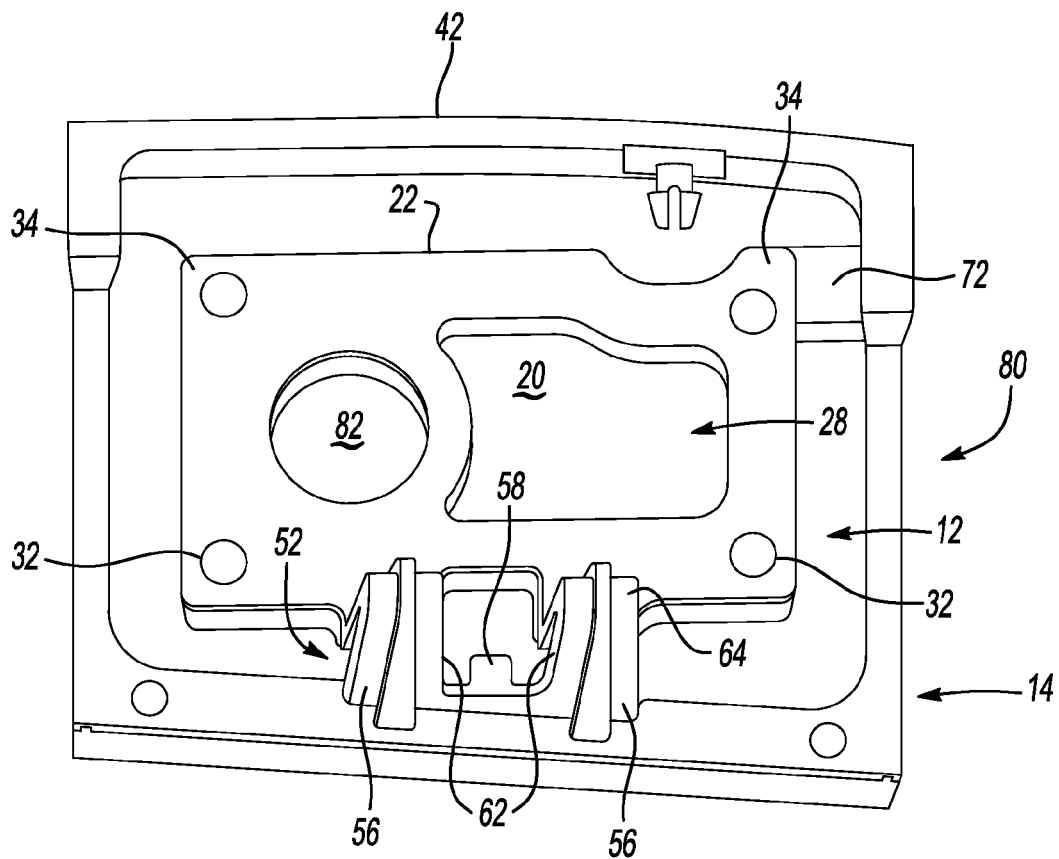
FIG. 4 is a front perspective view of an exemplary member in accordance with an aspect of the present invention.
Figure 5:
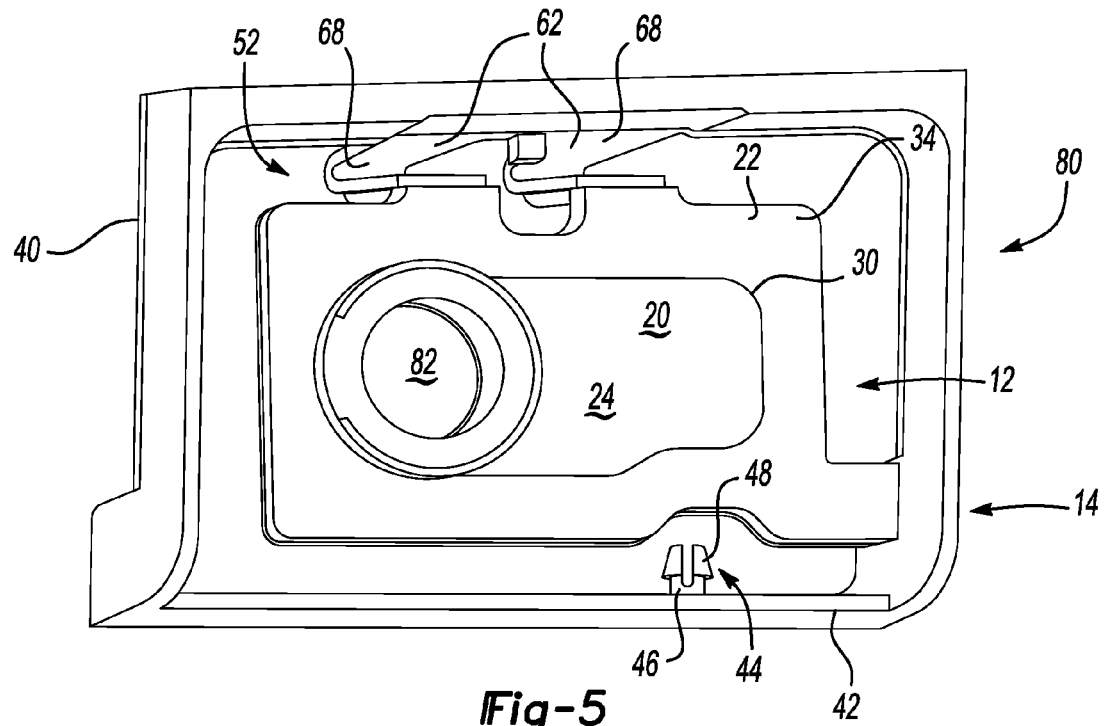
FIG. 5 is a rear perspective view of the exemplary member of FIG. 4.
Figure 6:
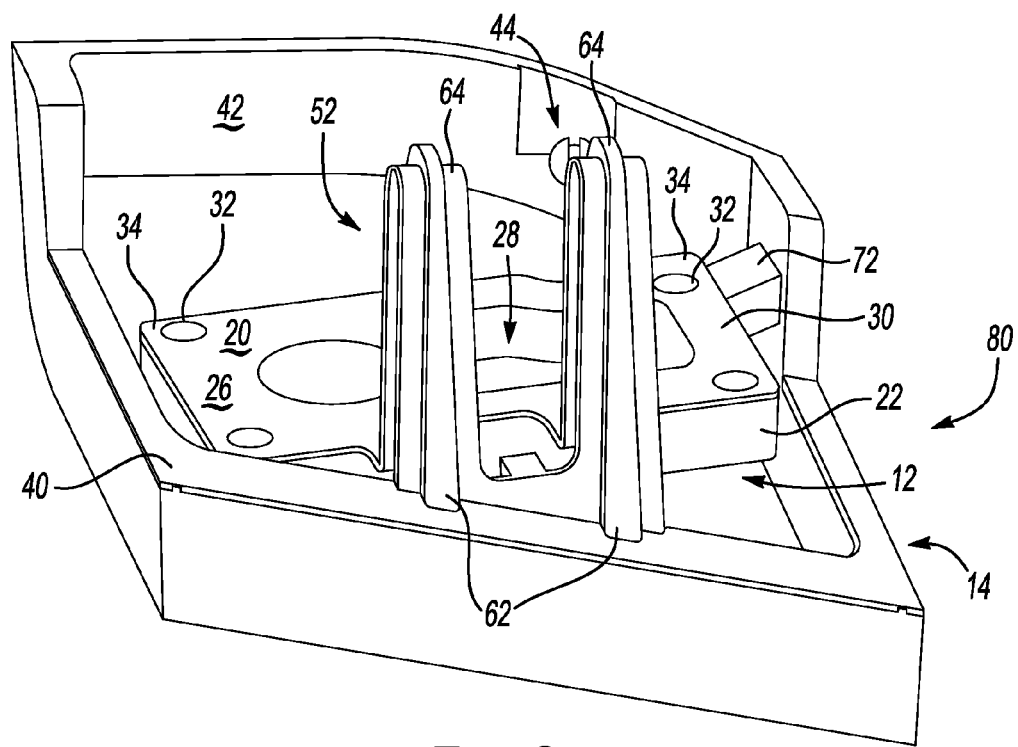
FIG. 6 is a side perspective view of the exemplary member of FIG. 4.

Referring to FIGS. 4-6, an alternative member 80 is illustrated. The member 80 is substantially similar to the member 10 of FIGS. 1-3 and it will be understood that, insofar as the member 80 of FIGS. 4-6 has the same or similar features as the member 10 of FIGS. 1-3, the description of the member 10 of FIGS. 1-3 can be equally applied to the member 80 of FIGS. 4-6. As such, reference numerals of the member 10 of FIGS. 1-3 have also been used to identify similar corresponding structures for the member 80 of FIGS. 4-6.

As shown, the member 80 of FIGS. 4-6 includes an opening 82, which is illustrated as a through-hole extending through the internal portion 12 of the member 80. The opening 82 can be defined by the expandable material 22 the carrier member 20 or a combination thereof. Preferably, the opening is designed to accommodate one or more components, which may need to extend through the opening 82 as further described below.

It should be understood that the specific shapes, configurations, materials and other specificities of the members of FIGS. 1-6, including the portions, the carrier members and the expandable materials, may be varied within the scope of the present invention, unless otherwise specified. The skilled artisan will be able to derive other shapes, configurations and materials for the members of the present invention while still remaining within the scope of the present invention.

A variety of expandable materials may be used for the gasket of the present invention. While the expandable materials 22, 42 of the members 10, 80 have different numerical designations, the materials may be made of the same material or different materials. Thus, the description herein discusses several potential expandable materials that may be used for the internal and/or external portions of the present invention.

In one embodiment, the expandable material may be formed of a heat activated material and may flow, cure (e.g., be thermosettable), foam or a combination thereof upon exposure to heat. The expandable material may be generally dry to the touch and substantially non-tacky or may be tacky and, in either situation, may be shaped in any form of desired pattern, placement, or thickness, and may have substantially uniform thickness or variable thickness. Exemplary expandable materials include L-7102 and L-7220 foams available through L&L Products, Inc. of Romeo, Mich. Another exemplary expandable material is disclosed in U.S. Pat. No. 7,199,165 titled "Expandable Material", and incorporated herein by reference for all purposes.

It is also contemplated that the expandable materials of the members may be replaced by activatable materials that do not substantially expand. As used for the present invention, the term activatable material is intended to mean a material that can be activated to cure, expand (e.g., foam), soften, flow or a combination thereof. Thus, it is contemplated for the present invention that an activatable material may be activated to perform only one of aforementioned activities or any combination of the aforementioned activities unless otherwise stated.

For example, activatable materials that are designed to activate to flow and cure like the expandable materials, but without foaming or expanding, may also be employed in the present invention.

Though other heat-activated materials are possible, a preferred heat activated material is an expandable polymer or plastic, and preferably one that is foamable. Particularly preferred materials are foamable or sealing materials, which include or are based upon an epoxy resin, an acrylate or an acetate combinations thereof or the like, which may be structural, sealing, baffling, acoustic or a combination thereof. For example, and without limitation, the foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based or otherwise based sealing, baffling or acoustic foams are known in the art and may be employed in the present invention. A typical foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the foam is usually initially processed as a flowable thermoplastic and/or thermosettable material before curing. It will cross-link (e.g. thermoset) upon curing, which makes the material incapable of further flow.

One advantage of the preferred foamable or activatable materials over prior art materials is that the preferred materials can be processed in several ways. The preferred materials can be processed by injection molding, extrusion, compression molding or with a mini-applicator. This enables the formation and creation of part designs that exceed the capability of most prior art materials.

While preferred materials have been disclosed, other materials may be used as well, particularly materials that are heat-activated or otherwise activated by an ambient condition (e.g. moisture, pressure, time, chemical reaction or the like) and cure in a predictable and reliable manner under appropriate conditions for the selected application. Of course, the material may also be formed of non-activatable materials, non-expandable materials or otherwise. Thus, upon activation, the material may soften, cure and expand; soften and cure only; cure only; soften only; or may be non-activatable.

One example of an expandable material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766, 719; 5,755,486; 5,575,526; and 5,932,680, (incorporated by reference). Polyurethane materials including a blocked isocyahate may also be employed. In general, the desired characteristics of the material include high glass transition temperature (typically greater than 70 degrees Celsius), and adhesion durability properties. In this manner, the material does not generally interfere with the materials systems employed by automobile manufacturers.

Other exemplary expandable materials can include combinations of two or more of the following: epoxy resin, polystyrene, styrene butadiene-styrene (SBS) block copolymer, butadiene acrylo-nitrile rubber, amorphous silica, glass microspheres, azodicarbonamide, urea, dicyandiamide. Examples of such materials are sold under the tradename SIKAELASTOMER, SIKAREINFORCER and SIKA-BAFFLE and are commercially available from the Sika Corporation, Madison Heights, Mich.

In applications where the material is a heat activated, thermally expanding material, an important consideration involved with the selection and formulation of the material comprising the foam is the temperature at which a material reaction or expansion, and possibly curing, will take place. Typically, the foam becomes reactive at higher processing temperatures, such as those encountered in an automobile assembly plant, when the foam is processed along with the automobile components at elevated temperatures or at higher applied energy levels, e.g., during paint, primer or e-coat baking or curing steps. While temperatures encountered in an automobile assembly operation may be in the range of about 148.890° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges. Generally, suitable expandable foams have a volumetric range of expansion ranging from approximately 0 to over 1000 percent (e.g., volumetric expansion of greater than 50%, 100%, 200% or 500% of the original unexpanded volume of the material).

The material or medium may be at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) placed along the mold through the use of baffle technology; a die-cast application according to teachings that are well known in the art; pumpable application systems which could include the use of a baffle and bladder system; and sprayable applications.

Formation

As discussed, the expandable materials 22, 42 can be processed in a number of different ways. As such, the expandable materials 22, 42 may be applied to the carrier members 20, 40 using a variety of techniques. In one exemplary preferred embodiment, the carrier members 20, 40 along with the attachment 52 are placed as an insert into a mold of an injection molding machine and the expandable materials 22, 42 are insert injection molded into place such that they adheres to the carrier members 20, 40. In another preferred exemplary embodiment, the members 10, 80 are two shot injection molded by injection a first shot of material to form the carrier members 20, 40 and injection molding a second shot of material to form and/or apply the expandable materials 22, 42 and position the expandable materials 22, 42 relative to the carrier members 20, 40.

Application

A member according to the present invention may be applied to a variety of locations upon a variety of articles of manufacture. Generally, a member in accordance with the present invention is quite suitable for application to a structure defining an internal cavity and also having an external surface. In such a circumstance, the internal portion of member can be located within the cavity of the structure for providing sealing, baffling or reinforcement internally within the structure while the external portion can be located adjacent the external surface of the structure for sealing, baffling or reinforcing about such surface.

The member of the present invention has been found particularly suitable for application to a first structure (e.g., a tubular structure) at a location where the first structure interfaces with a second structure. In such an embodiment, the internal portion of the member can be located within a cavity of the first structure for providing sealing, baffling or reinforcement internally within the structure while the external portion can be located adjacent the external surface and/or an interface (e.g., a gap, contacting surfaces or the like) defined by or between the first and second structures.

Figure 7:
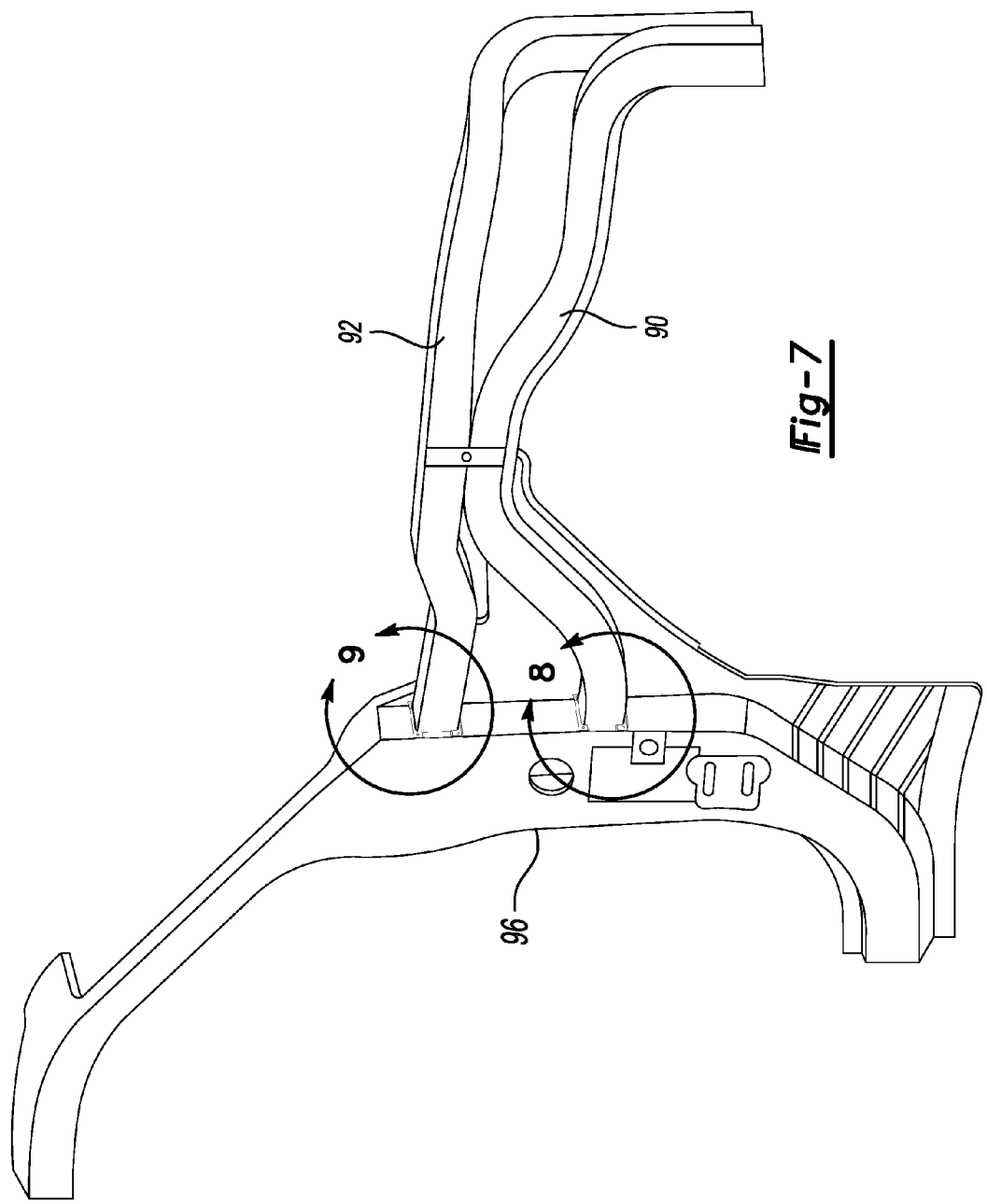
FIG. 7 is a perspective view of one or more exemplary structures of an automotive vehicle to which the exemplary members of FIGS. 1-6 may be applied.
Figure 8:
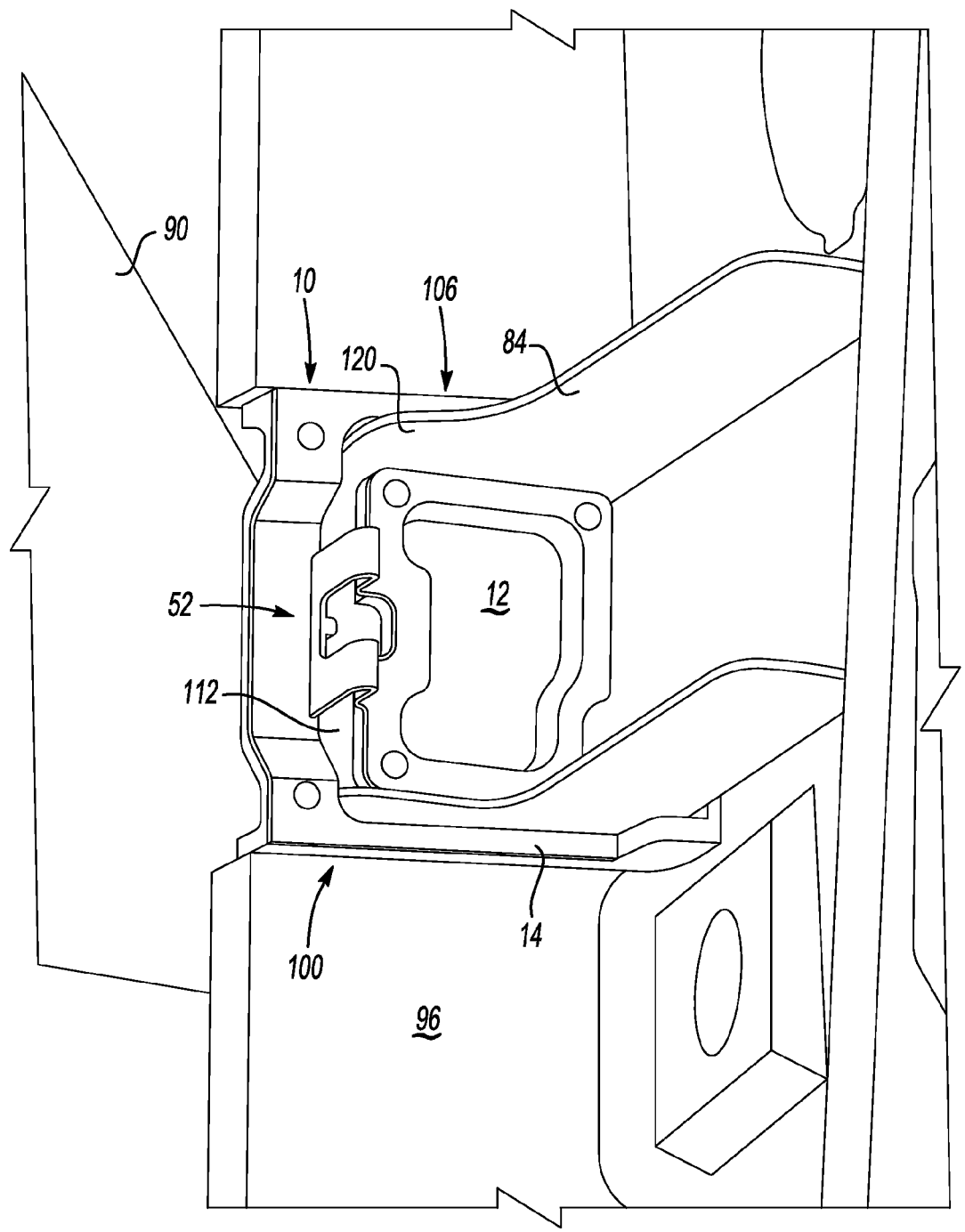
FIG. 8 is a perspective view of the exemplary member of FIGS. 1-3 as applied to one or more structures of an automotive vehicle.
Figure 9:
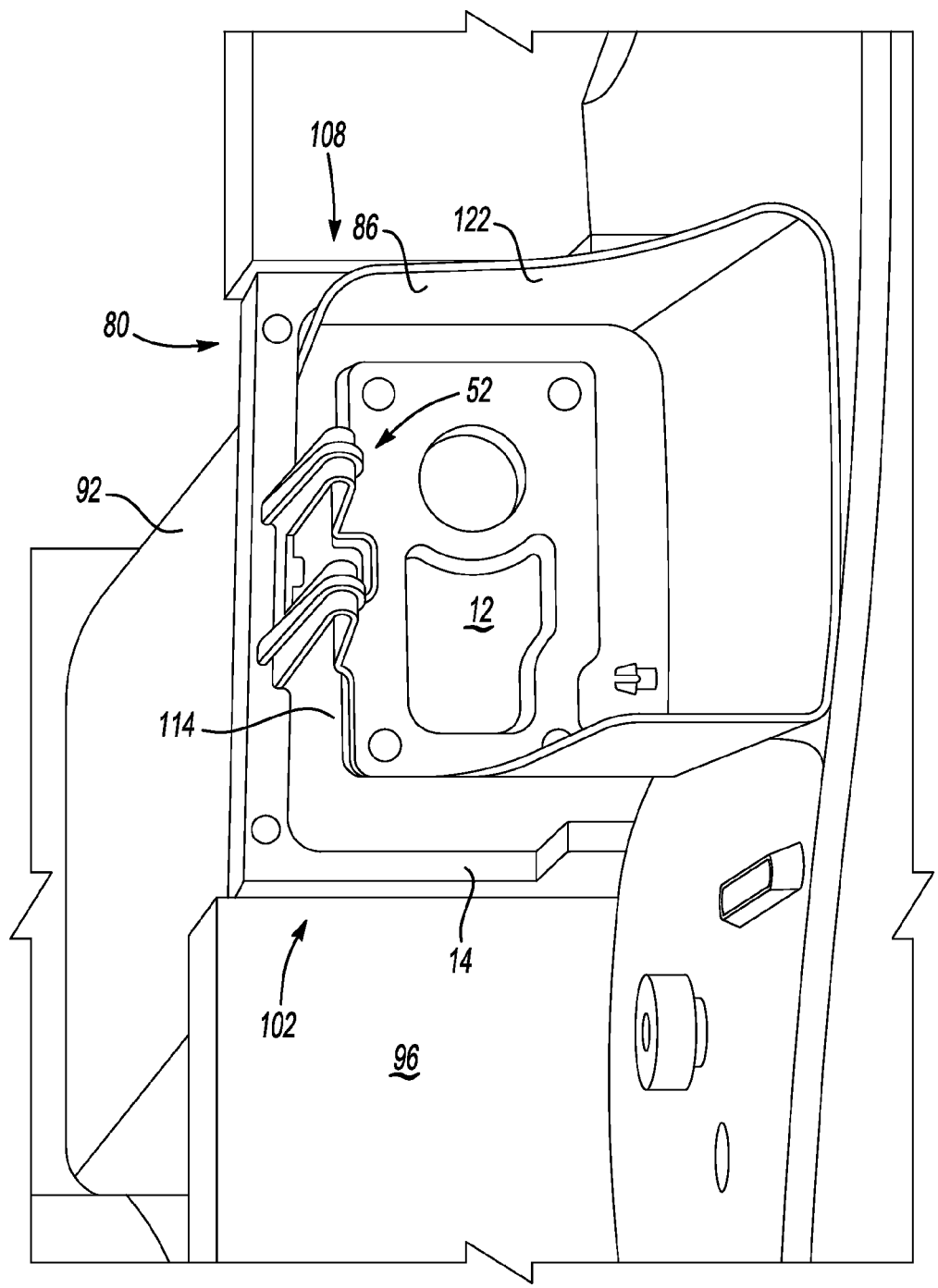
FIG. 9 is a perspective view of the exemplary member of FIGS. 4-6 as applied to one or more structures of an automotive vehicle.

For exemplary purposes, FIGS. 7-9 illustrate the members 10, 80 as being applied to ends 84, 86 of structures 90, 92 which are shown as hydroform tubular structures of an automotive vehicle. As can be seen, the tubular structures 90, 92 comprise at least a portion of the frame of the automotive vehicle and are designed to be assembled to portions of the vehicle such as the front quarter or fender panels. In can also be seen that the tubular structures 90, 92 extend into openings of a structure 96 shown as a post or pillar (e.g., a hinge or A-pillar) structure of the automotive vehicle. As such, annular interfaces 100, 102 (e.g., gaps, contact areas, combinations thereof or the like) are created between the tubular structures 90, 92 and the hinge or pillar structure 96.

For assembly, the members 10, 80 are attached to the tubular structures 90, 92. In particular, the internal portion 12 of each of the members 10, 80 is respectively located within cavities 106, 108 (e.g., tunnels) of the tubular structures 90, 92 by location of an edge 112, 114 of the respective structures 90, 92 into the cavities 68 formed by the attachments 52 of the members 10, 80. As such, the external portions 14 are located adjacent the interfaces 100, 102 and the external portions 14, and particularly the expandable material 42 of the external portions 14, may be coextensive with the interfaces 100, 102. In preferred embodiments, location of the members 10, 80 relative to the tubular structures 90, 92 is assisted by the protrusion 58 and the fastener 44, which can be inserted within openings (e.g., through-holes) located in the tubular structures 90, 92 the pillar structure 96 or a combination thereof.

As shown, the attachment members 52 attach the internal portion 12 to the external portion 14 and assist in attaching the members 10, 80 to a structure of an article of manufacture. It should be understood, however, that the attachment members 52 need only accomplish one of these functions while other attachments may be employed to accomplish the other function if desired.

Upon exposure to a condition such as heat (e.g., in an e-coat, primer or paint bake oven), the expandable or activatable materials of the member of the present invention are typically activated to flow, expand, cure or any combination thereof. Upon curing, the expandable or activatable materials typically adhere to an internal surface and/or an external surface of a structure to which the member has been assembled. In this manner, the expandable or activatable materials, alone or in conjunction with the carrier members can assist in sealing, baffling or reinforcement within a structure of an article of manufacture.

In the particular embodiments illustrated, the expandable material 22 of the internal portion 12 is activated to flow, expand and cure to adhere the material 22 to an internal surface 120, 122 of the tubular structures 90, 92 and optional adhering to a component extending through the through-hole 82 when such through-hole 82 is part of the member 80. In this manner, the internal portions 12 substantially continuously span the cavities 106, 108 of the structures 90, 92 for limiting, inhibiting and/or restricting the passage of materials, fluids, sound, combinations thereof or the like through the cavities 106, 108.

The expandable material 42 of the external portion 14 is activated to flow, expand and cure to adhere the material 42 to the tubular structures 90, 92 the pillar structure 96 or both at the interfaces 100, 102. In this manner, the expandable material 42 seals the interfaces 100, 102 and preferably substantially the entirely of the interfaces 100, 102 for limiting, inhibiting and/or restricting the passage of materials, fluids, sound, combinations thereof or the like through the interfaces 100, 102.

Figure 10A:
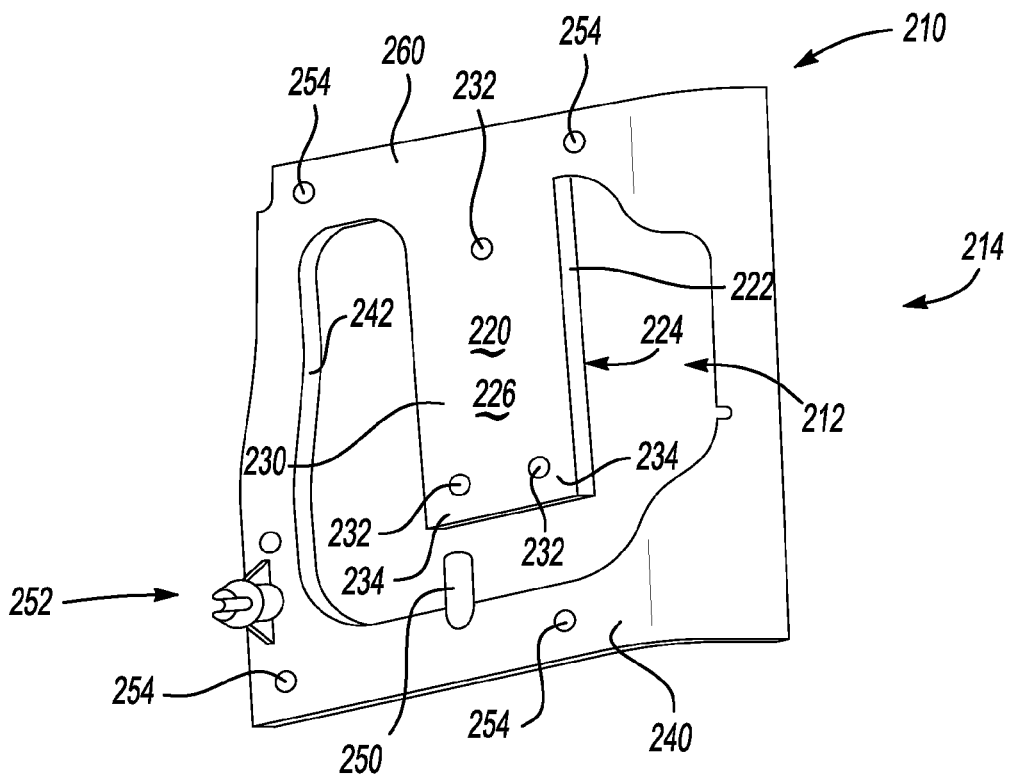
FIGS. 10A and 10B illustrate perspective views of another exemplary member of the present invention.
Figure 10B:
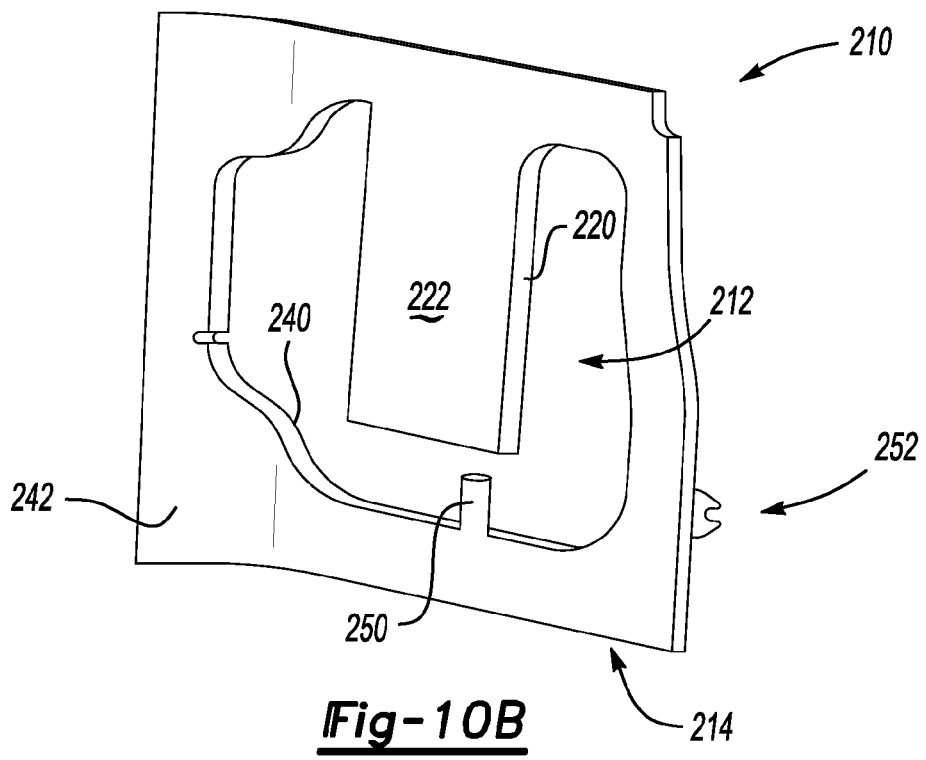

Referring to FIGS. 10A-10B, another embodiment of an exemplary member 210 is illustrated according to an aspect of the present invention. It will be recognized that the member 210 may be used in any of the manners discussed herein with respect to FIGS. 1-9 or otherwise.

The member 210 includes a first or internal portion 212 and second or external portion 214. The internal member 212 includes an internal carrier member 220 with expandable material 222 disposed thereon. The carrier member 220 is shown to be generally rectangular and substantially entirely flat or planar with a first generally planar surface 224 opposite a second surface 226. The carrier member 220 has an outer periphery 230 and the expandable material 222 is a generally continuous mass (shown as rectangular) that is coextensive with and opposing substantially the entire member 220, the first surface 224 or both for forming a laminate.

In FIGS. 10A-10B, the carrier member 220 includes an opening 232 (e.g., a through-hole) at or adjacent each of two corners 234 of the carrier member 220 and an opening 232 centrally located along an edge of the carrier member 220. The expandable material 222 extends at least partially into the openings 232 for assisting in attaching the expandable material to the carrier member 220.

The second or external portion 214 includes a carrier member 240 and an expandable material 242 that is attached to and at least partially coextensive with the carrier member 240. In the illustrated embodiment, the carrier member 240 is annular and the expandable material 242 is adhered to the carrier member 240. As can be seen, the carrier member 240 includes two fasteners 250, 252 (e.g., a pin and an interference fastener). The carrier member 240 also includes openings 254 into which the expandable material 242 extends for assisting in securing the material to the member The mass 242 of expandable material is annular and is entirely continuous, although the mass 242 could be non-continuous or intermittent. The mass 242 also includes multiple contours, which are typically designed to allow the mass 242 to substantially conform to one or more structures to which it is to be applied.

The member 210 of FIGS. 10A-10B, also includes at least one attachment for connecting the internal portion 212 to the external portion 214. In the embodiment shown, the carrier member 220 of the internal portion 212 is integrally formed of a singular material with the carrier member 240 of the external portion 214 such that an interface 260 between the portions 212, 214 connect the portions 212, 214 to each other. Suitable materials for the carrier members 220, 240 can include for example, and without limitation, metal or a polymeric material (e.g., nylon, polyamide, polyester, polypropylene, polyethylene or others) which may be filled or unfilled (e.g., filled with glass reinforcement fibers).

Figure 11A:
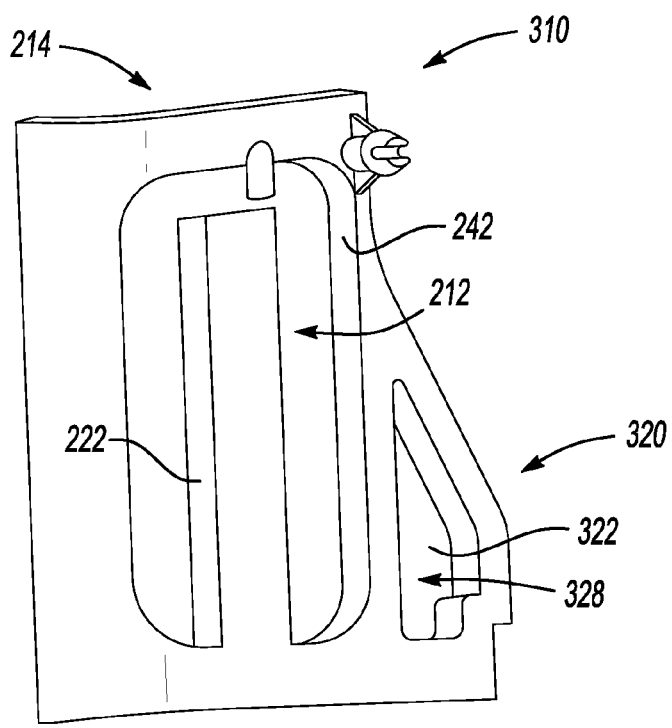
FIGS. 11A and 11B illustrate perspective views of another exemplary member of the present invention.
Figure 11B:
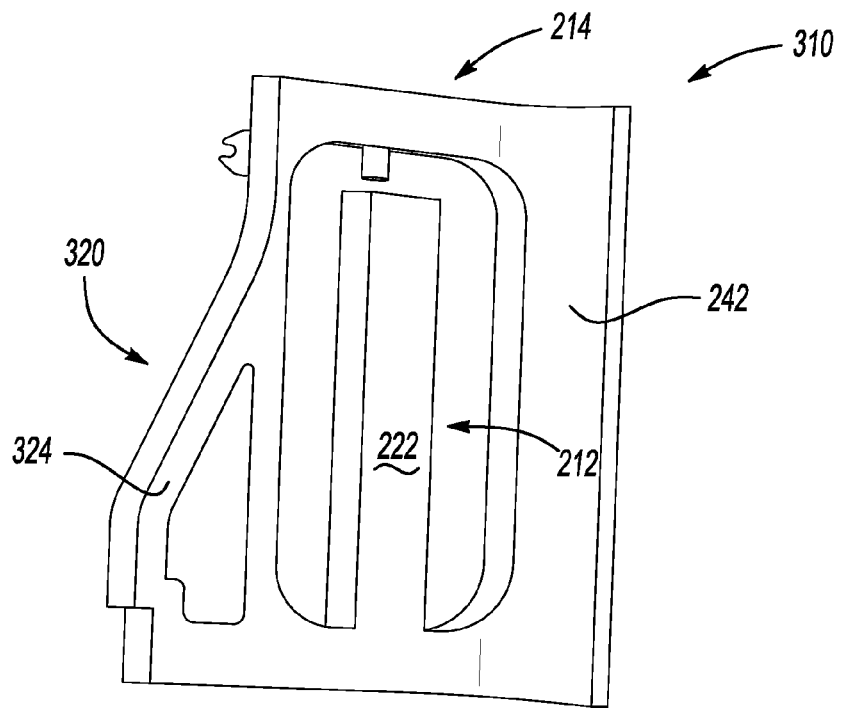

In FIGS. 11A-11B, another member 310 is illustrated. The member 310 is substantially similar to the member 210 of FIGS. 10A-10B with the exception that the member 310 includes an additional extension portion 320 that extends outwardly from the external portion 214 of the member 310. As shown, the extension portion 320 includes a carrier member 322 and a mass 324 of expandable material. As shown, the mass 324 extends about a periphery of the extension portion 320 and the carrier member 322 defines a centrally located cavity 328 about which the mass 324 extends.

Application of the members 210, 310 to a structure (e.g., a tubular structure or vehicle frame member interfaced with another member such as a vehicle pillar) can be accomplished by location of the fasteners 250, 252 within openings of the structure such that the external portion is coextensive with an interface of the structure while the internal portion is located within or adjacent a cavity of the structure as described for the previous embodiments. Also like the previous embodiments, the masses 222, 242 of expandable material of the members 210, 310 can be activated to expand and adhere to the structure for providing sealing, baffling, reinforcement or the like to the structure (e.g., the cavities or interfaces of the structure). Thus, the members 210, 310 of FIGS. 10A-11B can be applied to any structure to which the members of FIGS. 1-9 can be applied and can function in a similar manner. Advantageously, extension portions such as the extension portion 320 of the member 310 can assist in sealing, baffling, reinforcing or the like of additional open area of the structure such as additional space located about the external portion 214 upon installation of the member 310 to a structure. As an example, the extension portion 320 could seal an opening created by an interface of a tubular frame member with a vehicle pillar.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of providing sealing, baffling or reinforcement to a structure of an article of manufacture, comprising:
   providing a member for sealing, baffling or reinforcing the structure of the article, the member including an internal portion and an external portion, the article being an automotive vehicle, both the internal portion and the external portion including activatable material;
   locating the member adjacent the structure of the article, the structure of the article including a tubular structure and a pillar structure, the tubular structure defining a cavity and having an external surface, wherein:
   i. the internal portion of the member is located within the cavity defined by the tubular structure; and
   ii. the external portion of the member is located adjacent the external surface; and
   activating the activatable material of the internal portion and external portion thereby providing sealing at an interface of the tubular structure and the pillar and providing baffling, reinforcement or both to the tubular structure.

2. A method as in claim 1 wherein the internal portion is connected to the external portion.

3. A method as in claim 1 wherein the tubular structure is a hydroformed tube.

4. A method as in claim 1 wherein the internal portion includes an opening for allowing an object to pass therethrough.

5. A method as in claim 1 wherein:
   i) at least one attachment attaches the internal portion to the external portion and the at least one attachment includes a flange having a first portion opposing a second portion and forming an opening therebetween; and
   ii) an edge of the tubular structure of the article of manufacture is located within the opening between the first and second portions of the flange upon assembly of the member to the tubular structure.

6. A method as in claim 1 wherein the internal portion and the external portion each include a carrier member and the respective carriers are integrally molded of the same material and each of the carrier members includes activatable material disposed thereon.

7. A method as in claim 6 wherein the activatable material is expandable and thermosettable.

8. A method as in claim 1 wherein the activatable material entirely surround the tubular structure.

9. A method as in claim 8 wherein the tubular structure extends into an opening of the pillar structure of the article of manufacture.

10. A method as in claim 9 wherein the interface is annular and the external portion includes an activatable material that is annular to correspond to the interface such that that activatable material can foam and expand to seal the interface.

11. A method of providing sealing and baffling to an automotive vehicle structure, comprising:
    providing a member for sealing and baffling the vehicle structure, the member including an internal portion and an external portion, the internal portion including a carrier and both the internal portion and the external portion including an activatable material, wherein:
    i. the activatable material of the internal portion extends about a periphery of the carrier member of the internal portion; and
    ii. the internal portion is connected to the external portion;
    locating the member adjacent the vehicle structure, the vehicle structure including a first structure that forms an interface with a second structure, wherein:
    i. the internal portion of the member is located within a cavity defined by the first structure; and
    ii. the external portion of the member is located adjacent the interface and the activatable material of the external portion extends substantially continuously about the first structure;
    activating the activatable material of the internal portion and the activatable material of the external portion such that:
    i. the internal portion substantially continuously spans the cavity of the first structure thereby baffling the first structure; and
    ii. the activatable material of the external portion provides sealing to the interface.

12. A method as in claim 11 wherein the internal portion includes an opening for allowing an object to pass therethrough.

13. A method as in claim 11 wherein the first structure is a frame member of the automotive vehicle.

14. A method as in claim 13 wherein the second structure is a pillar structure of the vehicle.

15. A method as in claim 14 wherein the first structure is a hydroformed tube.

16. A method of providing sealing and baffling to a automotive vehicle structure, comprising:
   providing a member for sealing and baffling the vehicle structure, the member including an internal portion and an external portion, both the internal portion and the external portion including a carrier member and an activatable material disposed upon their respective carrier members, wherein:
      i. the activatable material of the internal portion and the activatable material of the external portion have a continuous annular configuration;
      ii. the activatable material of the internal portion and the external portion are heat activated thermosetting materials that foam, expand and cure upon exposure to temperature in an e-coat or bake oven; and
      iii. the activatable material of the internal portion and the external portion are generally dry and substantially non-tacky prior to activation; and
      iv. the activatable material of the internal portion extends about a periphery of the carrier member of the internal portion;
      v. the annular external portion extends about the internal portion; and
      vi. the internal portion is connected to the external portion;
   locating the member adjacent the vehicle structure, the vehicle structure including a hydroform tubular structure that forms an annular interface with a vehicle pillar structure, wherein:
      i. the internal portion of the member is located within a cavity defined by the tubular structure; and
      ii. the external portion of the member is located adjacent the annular interface;
   activating the activatable material of the internal portion and the activatable material of the external portion such that:
      i. the internal portion substantially continuously spans the cavity of the tubular structure thereby baffling the tubular structure; and
      ii. the activatable material of the external portion provides sealing to the interface.

17. A method as in claim 16 wherein the pillar structure is an A-pillar or a hinge pillar.

18. A method as in claim 16 wherein the activatable material of the internal portion and the external portion, upon activation, experience volumetric expansion of greater than 500% of the original unexpanded volume of the material.

19. A system as in claim 16 wherein the internal portion includes an opening for allowing an object to pass therethrough.

* * * * *